(12) United States Patent
Kondo et al.

(10) Patent No.: US 11,852,094 B2
(45) Date of Patent: Dec. 26, 2023

(54) FUEL PRESSURE CONTROL SYSTEM

(71) Applicant: DENSO CORPORATION, Kariya (JP)

(72) Inventors: Takahiro Kondo, Kariya (JP); Ryohei Sano, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/310,990

(22) Filed: May 2, 2023

(65) Prior Publication Data

US 2023/0272757 A1    Aug. 31, 2023

Related U.S. Application Data

(63) Continuation of application No. PCT/JP2021/037589, filed on Oct. 11, 2021.

(30) Foreign Application Priority Data

Nov. 4, 2020   (JP) ................................ 2020-184739

(51) Int. Cl.
   *F02D 41/22*   (2006.01)
   *F02D 1/02*   (2006.01)
   *F02M 59/46*   (2006.01)

(52) U.S. Cl.
   CPC .............. *F02D 41/22* (2013.01); *F02D 1/02* (2013.01); *F02M 59/46* (2013.01); *F02D 2041/226* (2013.01)

(58) Field of Classification Search
   CPC ...... F02D 41/22; F02D 1/02; F02D 2041/226; F02D 41/02; F02M 63/005; F02M 63/0052

See application file for complete search history.

(56) References Cited

U.S. PATENT DOCUMENTS

| | | | |
|---|---|---|---|
| 8,100,112 B2 * | 1/2012 | Nakata | F02D 41/40 |
| | | | 123/495 |
| 2006/0162695 A1 | 7/2006 | Shibata | |
| 2009/0188469 A1 | 7/2009 | Tsukada et al. | |
| 2011/0125387 A1 * | 5/2011 | Suzuki | F02M 59/466 |
| | | | 123/294 |
| 2012/0006302 A1 * | 1/2012 | Merigault | F02D 41/406 |
| | | | 123/495 |
| 2021/0348577 A1 | 11/2021 | Andou et al. | |

FOREIGN PATENT DOCUMENTS

| | | | | |
|---|---|---|---|---|
| DE | 102015209377 A1 * | 11/2016 | | F02D 41/22 |
| JP | 3493925 B2 * | 2/2004 | | F02D 41/22 |
| JP | 2009114980 A | 5/2009 | | |
| JP | 2010190147 A | 9/2010 | | |

* cited by examiner

*Primary Examiner* — Syed O Hasan
(74) *Attorney, Agent, or Firm* — Nixon & Vanderhye P.C.

(57) ABSTRACT

A fuel pressure control system for a fuel supply system of an injector of an engine includes: a booster pump for increasing a high-pressure system fuel pressure; a pressure reducing valve for reducing the high-pressure system fuel pressure; and a control device for controlling the booster pump and the pressure reducing valve. The control device includes a valve opening necessity determination unit for the pressure reducing valve. The control device executes a valve opening control for opening the pressure reducing valve. The control device further includes a restriction execution unit for performing a valve opening restriction control in the valve opening control to prevent a pressure exceeding a predetermined target portion threshold pressure from being applied to a target portion.

10 Claims, 4 Drawing Sheets

FUEL PRESSURE CONTROL SYSTEM

CROSS REFERENCE TO RELATED APPLICATIONS

The present application is a continuation application of International Patent Application No. PCT/JP2021/037589 filed on Oct. 11, 2021, which designated the U.S. and claims the benefit of priority from Japanese Patent Application No. 2020-184739 filed on Nov. 4, 2020. The entire disclosures of all of the above applications are incorporated herein by reference.

TECHNICAL FIELD

The present disclosure relates to a fuel pressure control system applied to a fuel supply system that supplies fuel to an injector of an engine.

BACKGROUND

The fuel pressure control system includes a boost pump that increases the fuel pressure of the high-pressure system as a part of the fuel supply system, a pressure reducing valve that reduces the fuel pressure of the high-pressure system, and a control device that controls the booster pump and the pressure reducing valve.

SUMMARY

According to an example, a fuel pressure control system for a fuel supply system of an injector of an engine includes: a booster pump for increasing a high-pressure system fuel pressure; a pressure reducing valve for reducing the high-pressure system fuel pressure; and a control device for controlling the booster pump and the pressure reducing valve. The control device includes a valve opening necessity determination unit for the pressure reducing valve. The control device executes a valve opening control for opening the pressure reducing valve. The control device further includes a restriction execution unit for performing a valve opening restriction control in the valve opening control to prevent a pressure exceeding a predetermined target portion threshold pressure from being applied to a target portion.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
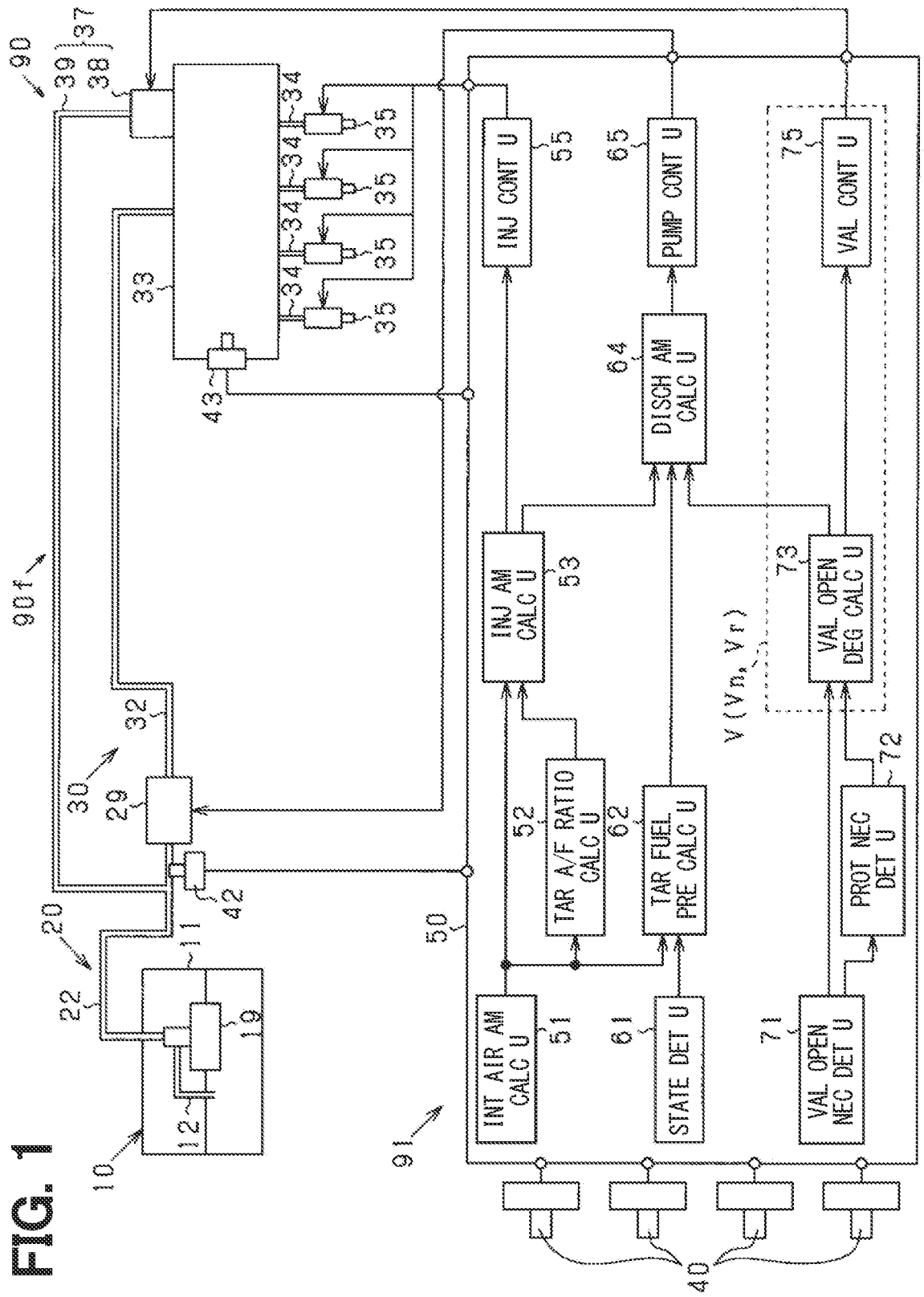
FIG. 1 is a schematic diagram showing a fuel pressure control system and its surroundings according to a first embodiment.

In a fuel pressure control system according to a conceivable technique, for example, when the fuel pressure of the high pressure system is high, if the pressure reducing valve is opened at once to release the fuel pressure of the high-pressure system to the outside, the released fuel may cause water hammer or may be vaporized. As a result, there is a possibility that a high pressure is temporarily applied to the target portion as the release destination or the release passage. As a result, the withstand pressure required for the target portion may be increased.

The present embodiments has been made in view of the above circumstances, and has an object to suppress the withstand pressure requirement of a target portion as a release destination or a release passage for fuel pressure in a high-pressure system.

The fuel pressure control system according to the present embodiments is applied to a fuel supply system that supplies fuel to an injector of an engine. The fuel pressure control system includes a booster pump for increasing a high-pressure system fuel pressure as a fuel pressure of the high-pressure system by discharging fuel to the high-pressure system as a part of the fuel supply system, and a pressure reducing valve for reducing the high-pressure system fuel pressure, and a control device that controls the booster pump and the pressure reducing valve.

The control device includes a valve opening necessity determination unit for determining whether the pressure reducing valve needs to be opened. Then, under a condition that the valve-opening necessity determination unit determines that the pressure reducing valve needs to be opened, the valve-opening control is executed to open the pressure reducing valve to release the high-pressure system fuel pressure to the outside of the high-pressure system.

The control device includes a restriction execution unit for performing a valve opening restriction control in the valve opening control for opening the pressure reducing valve with restricting a valve opening degree of the pressure reducing valve to prevent a pressure exceeding a predetermined target portion threshold pressure from being applied to a target portion as a release destination or a release passage of the high-pressure system fuel pressure in the valve opening control.

According to the present embodiments, by executing the valve opening restriction control to restrict the valve opening degree of the pressure reducing valve, the pressure exceeding the target portion threshold pressure is prevented from being applied to the target portion. Therefore, the withstand pressure requirement of the target portion can be suppressed to the threshold pressure of the target portion.

Embodiments of the present disclosure will now be described with reference to the drawings. It is noted that, the present disclosure is not limited to the embodiments and may be implemented with appropriate modification without departing from the aspect of the disclosure.

First Embodiment

First, the points of this embodiment will be described. As shown in FIG. 1, the fuel pressure control system 91 is applied to a fuel supply system 90$f$ that supplies fuel to the injectors 35 of the engine 90. The system 91 has a booster pump 29, a pressure reducing valve 38 and a control device 50.

The booster pump 29 increases the fuel pressure of the high pressure system 30 by discharging fuel to the high pressure system 30 as a part of the fuel supply system 90$f$. Hereinafter, the fuel pressure of the high pressure system 30 will be referred to as "high pressure system fuel pressure PH". On the other hand, the pressure reducing valve 38 is a valve for releasing the high-pressure system fuel pressure PH to a predetermined second low-pressure system 20 to reduce the high-pressure system fuel pressure PH. Hereinafter, the fuel pressure of the second low-pressure system 20 to which the pressure is released is referred to as "second low-pressure system fuel pressure PL".

The control device 50 controls the booster pump 29 and the pressure reducing valve 38. Specifically, the control device 50 has a target fuel pressure calculation unit 62 that calculates a predetermined high-pressure system target fuel pressure PHt, and controls the high-pressure system fuel pressure PH to approach the high-pressure system target fuel pressure PHt. The control device 50 also has a valve-opening necessity determination unit 71 that determines whether or not the pressure-reducing valve 38 needs to be opened. The device 50 executes the valve opening control V for opening the pressure reducing valve 38 under a condition that the valve-opening necessity determination unit 71 determines that the pressure-reducing valve 38 needs to be opened. In the valve opening control V, the control device 50 calculates the target valve opening degree Ot by the predetermined valve opening degree calculation unit 73, and controls the valve opening degree of the pressure reducing valve 38 to approach the calculated target valve opening degree Ot.

The control device 50 also has a protection necessity determination unit 72 that determines whether or not it is in a predetermined protection required state before executing the valve opening control V. The protection required state is, for example, the state in which there is a risk that the pressure exceeding the predetermined second low-pressure system threshold pressure PLx may be applied to the second low-pressure system 20 due to the water hammer caused by the fuel released in the valve opening control V unless the predetermined valve opening restriction control Vr is executed in the valve opening control V, which is shown in the comparative example state as a dashed line in FIG. 3C.

The control device 50 shown in FIG. 1 executes the normal valve opening control Vn without performing the valve opening restriction control Vr in the valve-opening control V when the valve-opening necessity determination unit 71 determines that the pressure reducing valve needs to be opened and the protection necessity determination unit 72 determines that it is not in the protection required state. On the other hand, when the valve-opening necessity determination unit 71 determines that the pressure reducing valve needs to be opened and the protection necessity determination unit 72 determines that it is in the protection required state, the valve-opening restriction control Vr is executed in the valve-opening control V to restrict the opening degree of the pressure reducing valve 38 as compared with the case where the valve opening restriction control Vr is not executed.

Figure 3A:
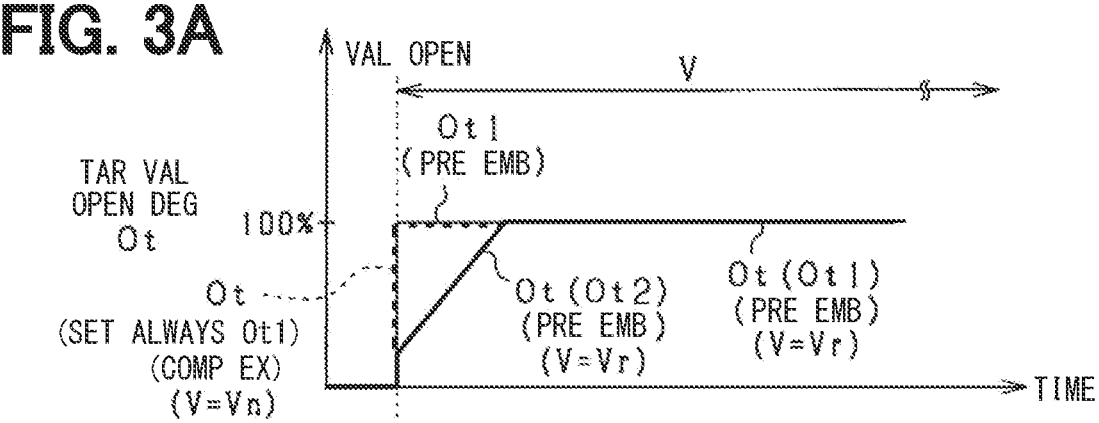
FIGS. 3A to 3C are graphs showing the transition of each value in a valve opening restriction control in a predetermined situation.

Specifically, in the valve opening restriction control Vr, for example, as indicated by a thick solid line in FIG. 3A, the target valve opening degree Ot is set to be a smaller value (for example, 20%) than the predetermined value (for example, 100%) in the beginning of the opening of the pressure reducing valve, and then, the target valve opening degree Ot is gradually increased to the predetermined value (for example, 100%). As a result, compared to the case of the comparative example indicated by the thick dashed line in FIG. 3A, i.e., compared with the case where the target valve opening degree Ot is set to be the predetermined value (for example, 100%) in the beginning of the opening of the pressure reducing valve, the pressure to be applied to the second low-pressure system 20 by opening the pressure reducing valve is reduced so that the second low-pressure system fuel pressure PL does not exceed the second low-pressure system threshold pressure PLx, as shown in FIG. 3C.

Figure 4A:
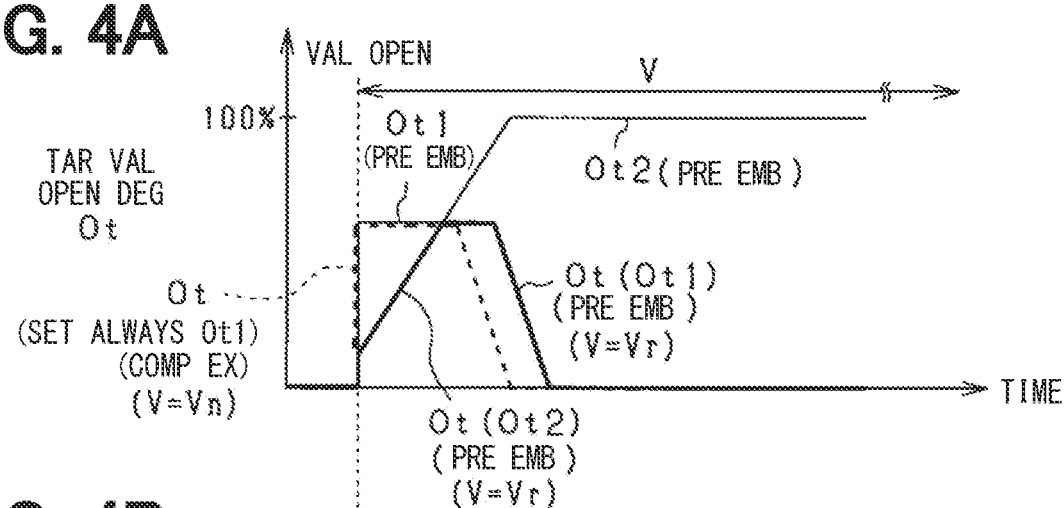
FIGS. 4A to 4C are graphs showing the transition of each value in a valve opening restriction control in another situation different from that in FIGS. 3A to 3C.

More specifically, in the valve-opening restriction control Vr, the valve-opening degree calculation unit 73 calculates both a predetermined optimum valve-opening degree Ot1 and a predetermined allowable valve-opening degree Ot2, as shown in FIG. 4A. The optimum valve opening degree Ot1 is the optimum valve opening degree when protection of the second low-pressure system 20 is not taken into consideration. The allowable valve opening degree Ot2 is a valve opening degree of the pressure reducing valve 38 that is equal to or lower than the upper limit within a range in which there is no risk that the pressure exceeding the second low-pressure system threshold pressure PLx is applied to the second low-pressure system 20. Specifically, the degree Ot2 is an opening degree that is smaller than the upper limit by a predetermined margin.

Then, in the valve opening restriction control Vr, the smaller one of both valve opening degrees Ot1 and Ot2 is always adopted as the target valve opening degree Ot. Note that if both valve opening degrees Ot1 and Ot2 have the same value, either one may be adopted as the target valve opening degree Ot. As described above, compared to the case of the comparative example indicated by the thick dashed line in FIG. 4A, i.e., compared with the case where the optimum valve opening degree Ot1 is always adopted as the target valve opening degree Ot, in the present embodiment, as indicated by the thick solid line in FIG. 4A, the target valve opening degree Ot of the pressure reducing valve 38 is limited for a while from the start of valve opening.

Below, the opening of the pressure reducing valve 38 is referred to as the "balance valve opening" such that, as indicated by the solid line in FIG. 3B, the high-pressure system fuel pressure PH does not exceed the high-pressure system threshold pressure PHx, and as indicated by the solid line in FIG. 3C, the second low pressure system fuel pressure PL does not exceed the second low pressure system threshold pressure PLx. The control device 50 shown in FIG. 1 a state determination unit 61 that determines whether or not it is in a caution required state in which there is a risk that the balance valve opening is not executable in the valve opening restriction control Vr if a predetermined anomaly increase in the high-pressure system fuel pressure PH occurs. The anomaly increase includes, for example, a fuel pressure increase due to a full discharge anomaly in which the discharge flow rate of the booster pump 29 reaches the maximum value of the discharge flow rate that can be discharged by the booster pump 29.

The control device 50 controls the target fuel pressure calculation unit 62 to start the predetermined fuel pressure restriction control on the condition that the state determination unit 61 determines that it is in a caution required state, so that the high-pressure system target fuel pressure PHt is set to be lower than a case where the fuel pressure restriction control is not executed. As a result, even if the high-pressure system fuel pressure PH anomaly increases, the balance valve opening can be executed. Then, the balance valve opening is actually executed.

Next, a description will be given of details of the present embodiment in a form in which points of the present embodiment are supplemented.

FIG. 1 is a schematic diagram showing a fuel pressure control system 91 and its surroundings according to the present embodiment. The fuel supply system 90f has the first low pressure system 10, the second low pressure system 20, and the high pressure system 30 described above. A feed pump 19 for supplying the fuel of the first low-pressure system 10 to the second low-pressure system 20 is arranged between the first low-pressure system 10 and the second low-pressure system 20. Between the second low-pressure system 20 and the high-pressure system 30, the booster pump 29 for boosting the fuel in the second low-pressure system 20 and supplying the fuel to the high-pressure system 30 is arranged.

The first low-pressure system 10 has a fuel tank 11 for storing the fuel and a first pipe 12 for sucking up the fuel in the fuel tank 11 to a feed pump 19. The second low-pressure system 20 has a second pipe 22 connecting the feed pump 19 and the booster pump 29 to each other.

The high pressure system 30 has a third pipe 32, an pressure accumulation chamber 33, a fourth pipe 34 and an injector 35. The third pipe 32 connects the booster pump 29 and the pressure accumulation chamber 33 to each other. The fourth pipe 34 connects the pressure accumulation chamber 33 and the injector 35 to each other. The pressure reducing mechanism 37 for reducing the high pressure system fuel pressure PH is provided for the high pressure system 30.

The pressure reducing mechanism 37 has a return pipe 39 that connects the pressure accumulation chamber 33 and the second pipe 22 to each other, and the pressure reducing valve 38 that opens and closes the return pipe 39. The pressure reducing valve 38 is provided, for example, at a connection portion of the pressure accumulation chamber 33 with the return pipe 39, the return pipe 39, and the like. The pressure reducing valve 38 may be, for example, a solenoid valve or a butterfly valve.

When the pressure reducing valve 38 is a solenoid valve, it is opened by attracting a valve body (not shown) by an electromagnetic solenoid (not shown) when energized, and closed by canceling the attraction when the energization is stopped. Further, when the pressure reducing valve 38 is a butterfly valve, the valve opening amount is adjusted by adjusting the rotation of a disk (not shown) provided in the return pipe 39 or the like.

A fuel pressure sensor 42 for detecting the second low-pressure system fuel pressure PL, a fuel pressure sensor 43 for detecting the high-pressure system fuel pressure PH, and various other sensors 40 are arranged for the engine 90. Examples of the various sensors 40 include a crank angle sensor, an air flow sensor (an airflow meter), various pressure sensors, various temperature sensors, air-fuel ratio sensors, accelerator opening degree sensors, and the like.

More specifically, the various pressure sensors include an air intake pressure sensor that detects air intake pressure, an exhaust pressure sensor that detects exhaust pressure, an internal pressure sensor that detects pressure in a combustion chamber, and the like. Various temperature sensors include a water temperature sensor that detects the temperature of cooling water, a fuel temperature sensor that detects the temperature of fuel, an oil temperature sensor that detects the temperature of lubricating oil, and an intake air temperature sensor that detects the temperature of intake air, an exhaust gas temperature sensor that detects the temperature of the exhausted gas, an outside air temperature sensor that detects the temperature of the outside air, and the like.

The control device 50 controls the injector 35, the booster pump 29, the pressure reducing valve 38, and the like based on the information input from each of these sensors 40, 42, 43.

The control device 50 has an intake air amount calculation unit 51, a target air-fuel ratio calculation unit 52, an injection amount calculation unit 53, and an injection control unit 55 as parts for controlling the injector 35. The intake air amount calculation unit 51 calculates the intake air amount based on the intake pressure, the rotation speed of the engine 90, and the like. The target air-fuel ratio calculation unit 52 calculates the target air-fuel ratio based on the calculated intake air amount, an accelerator opening degree, rotation speed of the engine 90, and the like. Based on the calculated intake air amount, the target air-fuel ratio, and the like, the injection amount calculation unit 53 calculates a target injection amount, which is a target value of the injection amount per combustion cycle. The injection control unit 55 controls the fuel injection by the injector 35 based on the calculated target injection amount and the like.

The control device 50 has, as parts for controlling the booster pump 29, the above-described state determination unit 61, the above-described target fuel pressure calculation unit 62, a discharge amount calculation unit 64, and a pump control unit 65.

The target fuel pressure calculation unit 62 calculates a high-pressure system target fuel pressure PHt based on the amount of intake air, the rotational speed of the engine 90, the degree of accelerator opening, and the like. Here, when the state determination unit 61 determines that it is in the caution required state, the target fuel pressure calculation unit 62 downwardly corrects the high-pressure system target fuel pressure PHt as the fuel pressure restriction control described above. The details of the determination of whether or not it is in a caution required state by the state determination unit 61 and the downward correction by the target fuel pressure calculation unit 62 will be described later.

Based on the high-pressure system target fuel pressure PHt set by the target fuel pressure calculation unit 62 as described above, the current high-pressure system fuel pressure PH, the rotation speed of the engine 90, and the like, the discharge amount calculation unit 64 calculates the target discharge amount, which is a target value of the discharge amount per combustion cycle by the booster pimp 29. The pump control unit 65 controls the booster pump 29 based on the calculated target discharge amount.

The control device 50 includes, as parts for controlling the pressure reducing valve 38, the valve opening necessity determination unit 71, the protection necessity determination unit 72, the valve opening degree calculation unit 73, and the valve control unit 75. On the condition that the valve opening necessity determination unit 71 determines that the valve needs to be opened, the protection necessity determination unit 72 determines whether or not it is in the protection required state. The details of the determination of whether or not the valve needs to be opened by the valve-opening necessity determination unit 71 and the determination of whether or not it is in the protection necessity state by the protection necessity determination unit 72 will be described later.

When the valve opening necessity determination unit 71 determines that the valve needs to be opened and the protection necessity determination unit 72 determines that it is not in the protection required state, the valve opening degree calculation unit 73 calculates only the optimum valve opening degree Ot1 as one of the two valve opening degrees Ot1 and Ot2 among the optimum valve opening degree Ot1 and the allowable valve opening degree Ot2. Then, the optimum valve opening degree Ot1 is adopted as the target valve opening degree Ot.

The optimum valve opening degree Ot1 can be calculated based on parameters such as the high-pressure system fuel pressure PH, the high-pressure system target fuel pressure PHt, and the rotation speed of the engine 90, for example. The optimum valve opening degree Ot1 may be calculated using a map showing the relationship between each of these parameters, or the optimum valve opening degree Ot1 may be calculated using a mathematical equation showing the relationship.

On the other hand, when the valve opening necessity determination unit 71 determines that the valve needs to be opened and the protection necessity determination unit 72 determines that it is in the protection required state, as described above, the valve opening degree calculation unit 73 calculates both valve opening degree Ot1 and Ot2, i.e., the optimum valve opening degree Ot1 and the allowable valve opening degree Ot2, and the smaller one of them is adopted as the target valve opening degree Ot. The details of the calculation of the allowable valve opening degree Ot2 will be described later.

Hereinafter, the optimum valve opening degree Ot1, the allowable valve opening degree Ot2, and the target valve opening degree Ot are referred to as "the target valve opening degree and the like Ot1, Ot2, Ot". The target valve opening degree and the like Ot1, Ot2, and Ot may each be a target valve opening duty or a target valve opening amount. Specifically, for example, when the pressure reducing valve 38 is controlled by two options, such as a solenoid valve or the like, to open or close, the valve opening degree calculation unit 73 calculates, as the target valve opening degree and the like Ot1, Ot2, and Ot, a target valve opening duty as a ratio of the time during which the pressure reducing valve 38 should be opened within a unit time. Further, for example, when the pressure reducing valve 38 is a butterfly valve or the like whose valve opening amount can be adjusted, the valve opening degree calculation unit 73 calculates the target valve opening amount by which the pressure reducing valve 38 should be opened as the target valve opening degree and the like Ot1, Ot2, and Ot.

Then, the valve control unit 75 controls the pressure reducing valve 38 based on the target valve opening degree Ot calculated by the valve opening degree calculation unit 73. As described above, the valve opening control V including the normal valve opening control Vn and the valve opening restriction control Vr is executed by the valve opening degree calculation unit 73 and the valve control unit 75. Therefore, the "restriction execution unit" referred to in the present embodiments is configured by the valve opening degree calculation unit 73 and the valve control unit 75.

Next, the details of the valve-opening necessity determination by the valve-opening necessity determination unit 71 will be described. The valve-opening necessity determination unit 71 determines that the valve-opening necessity is required, for example, in the case of the excessive valve-opening pressure state, the pressure reduction mode, or the actual pressure divergence state described below.

The excessive valve opening pressure state is a state in which the high pressure system fuel pressure PH exceeds a predetermined valve opening pressure PHo which is less than the high pressure system threshold pressure PHx. The valve opening pressure PHo is a pressure at which the pressure reducing valve 38 needs to be opened because the high-pressure system fuel pressure PH has increased too much, i.e., the high-pressure system fuel pressure PH has become too close to the high-pressure system threshold pressure PHx. Specifically, for example, it is a pressure (slightly lower pressure) that is several percent to ten and several percent lower than the high pressure system threshold pressure PHx.

The valve opening pressure PHo may be, for example, a constant, or a variable that varies depending on the rotation speed of the engine 90, fuel temperature, and the like. Specifically, when using a variable valve opening pressure PHo, for example, the higher the rotation speed of the engine 90, the lower the valve opening pressure PHo may be set. As the rotation speed of the engine 90 increases, the discharge flow rate that can be increased by the booster pump 29 increases. Thus, it is because the grace period from when the high-pressure system fuel pressure PH exceeds the valve opening pressure PHo to when the high-pressure system fuel pressure PH exceeds the high-pressure system threshold pressure PHx may be shortened if the full discharge anomaly and the like occurs. The increasable discharge flow rate is the difference between the current discharge flow rate of the booster pump 29 and the discharge flow rate of the booster pump 29 when the above full discharge anomaly occurs in the booster pump 29.

Further, for example, the lower the temperature of the fuel, the lower the valve opening pressure PHo should be set. The lower the temperature of the fuel, the higher the volume modulus of the fuel, and the greater the water hammer at the time of discharge. Therefore, if a full discharge anomaly or the like occurs, the grace period from when the high-pressure system fuel pressure PH exceeds the valve opening pressure PHo to when the high-pressure system fuel pressure PH exceeds the high-pressure system threshold pressure PHx is shortened.

The pressure reduction mode is a state in which the high-pressure system fuel pressure PH needs to be lowered, such as a state immediately before the vehicle equipped with the fuel pressure control system 91 is parked.

The actual pressure divergence state is a state in which the high-pressure system fuel pressure PH is considerably higher than the high-pressure system target fuel pressure PHt, and it is assumed that the high-pressure system fuel pressure PH will not easily drop to the high-pressure system target fuel pressure PHt only by fuel injection from the injector 35. Specifically, for example, the actual pressure divergence state is determined on the condition that the divergence pressure $\Delta P$, which is the difference between the high-pressure system fuel pressure PH and the high-pressure system target fuel pressure PHt, exceeds a predetermined divergence threshold pressure $\Delta Po$. The divergence threshold pressure $\Delta Po$ may be a constant, or may be a variable that varies depending on the rotational speed of the engine 90, the intake air amount, the engine load, various temperatures, fuel properties, and the like. Specifically, when the variable divergence threshold pressure $\Delta Po$ is used, for example, in an environment where the divergence pressure $\Delta P$ tends to increase inevitably, or in a situation where the high-pressure system fuel pressure PH tends to return to the high-pressure system target fuel pressure PHt even if it becomes large, the divergence threshold pressure $\Delta Po$ may be preferably set to be relatively large, and the divergence threshold pressure $\Delta Po$ may be set to be relatively small in other situations.

Next, the details of the determination by the protection necessity determination unit 72 of whether or not it is in the protection required state and the calculation of the allowable valve opening degree Ot2 by the valve opening degree calculation unit 73 will be described. Determination of whether or not it is in the protection required state and calculation of the allowable valve opening degree Ot2 are performed, for example, based on the inter-system fuel pressure difference (PH-PL), which is the difference between the high-pressure system fuel pressure PH and the second low-pressure system fuel pressure PL, a second low-pressure system fuel pressure margin (PLx-PL), which is the difference between the second low-pressure system fuel pressure PL and the second low-pressure system threshold pressure PLx, and parameters such as fuel temperature.

Specifically, for example, the greater the inter-system fuel pressure difference (PH-PL), the easier it is to determine that the system is in a protection required state, or the allowable valve opening degree Ot2 may be set smaller. This is because the larger the inter-system fuel pressure difference (PH-PL), the easier it is for the second low-pressure system fuel pressure PL to increase when the pressure reducing valve 38 is opened.

Further, for example, the smaller the second low-pressure system fuel pressure margin (PLx-PL), the easier it is to determine that it is in the protection required state, or the allowable valve opening degree Ot2 may be set smaller. This is because the smaller the second low-pressure system fuel pressure margin (PLx-PL), the easier it is for the second low-pressure system fuel pressure PL to exceed the second low-pressure system threshold pressure PLx when the pressure reducing valve 38 is opened.

Further, for example, the lower the temperature of the fuel, the easier it is to determine that it is in the protection required state, or the allowable valve opening degree Ot2 may be set smaller. This is because the lower the temperature of the fuel, the higher the volume modulus of the fuel, and the greater the instantaneous fuel pressure increase in the second low-pressure system 20 due to the water hammer immediately after the pressure reducing valve 38 opens.

The optimum valve opening degree Ot1 may be calculated using a map showing the relationship between each of these parameters, or the optimum valve opening degree Ot1 may be calculated using a mathematical equation showing the relationship.

Next, the details of the determination of whether or not it is in a caution-required state by the state determination unit 61 and the downward correction of the high-pressure system target fuel pressure PHt by the target fuel pressure calculation unit 62 will be described. The determination of whether or not it is in the caution required state and the downward correction of the high-pressure system target fuel pressure PHt are performed based on, for example, the increasable discharge flow rate of the booster pump 29, the difference between the high-pressure system fuel pressure PH and the high-pressure system threshold pressure PHx as the high-pressure system fuel pressure margin (PHx-PH), the low-pressure system fuel pressure margin (PLx-PL) and the like.

Specifically, for example, the larger the increasable discharge flow rate of the booster pump 29 is, the easier it is to determine that it is in the caution required state, or the high-pressure system target fuel pressure PHt may be corrected downward to a smaller target fuel pressure. This is because the higher the increasable discharge flow rate is, the easier it is for the high-pressure system fuel pressure PH to rise if a full discharge anomaly or the like occurs.

Further, for example, the smaller the high-pressure system fuel pressure margin (PHx-PH), the easier it is to determine that it is in the caution required state, or the high-pressure system target fuel pressure PHt may be corrected downward to a smaller target fuel pressure. This is because the smaller the high-pressure system fuel pressure margin (PHx-PH), the more easily the high-pressure system fuel pressure PH exceeds the high-pressure system threshold pressure PHx.

Further, for example, the smaller the second low-pressure system fuel pressure margin (PLx-PL), the easier it is to determine that it is in the caution required state, or the high-pressure system target fuel pressure PHt may be corrected downward to a smaller target fuel pressure. This is because the smaller the second low-pressure system fuel pressure margin (PLx-PL), the easier it is for the second low-pressure system fuel pressure PL to exceed the second low-pressure system threshold pressure PLx when the pressure reducing valve 38 is opened.

The downward correction of the high-pressure system target fuel pressure PHt may be performed using a map showing the relationship between the magnitude of each parameter and the amount of correction described above, or may be performed using a mathematical equation showing the relationship.

Figure 2:
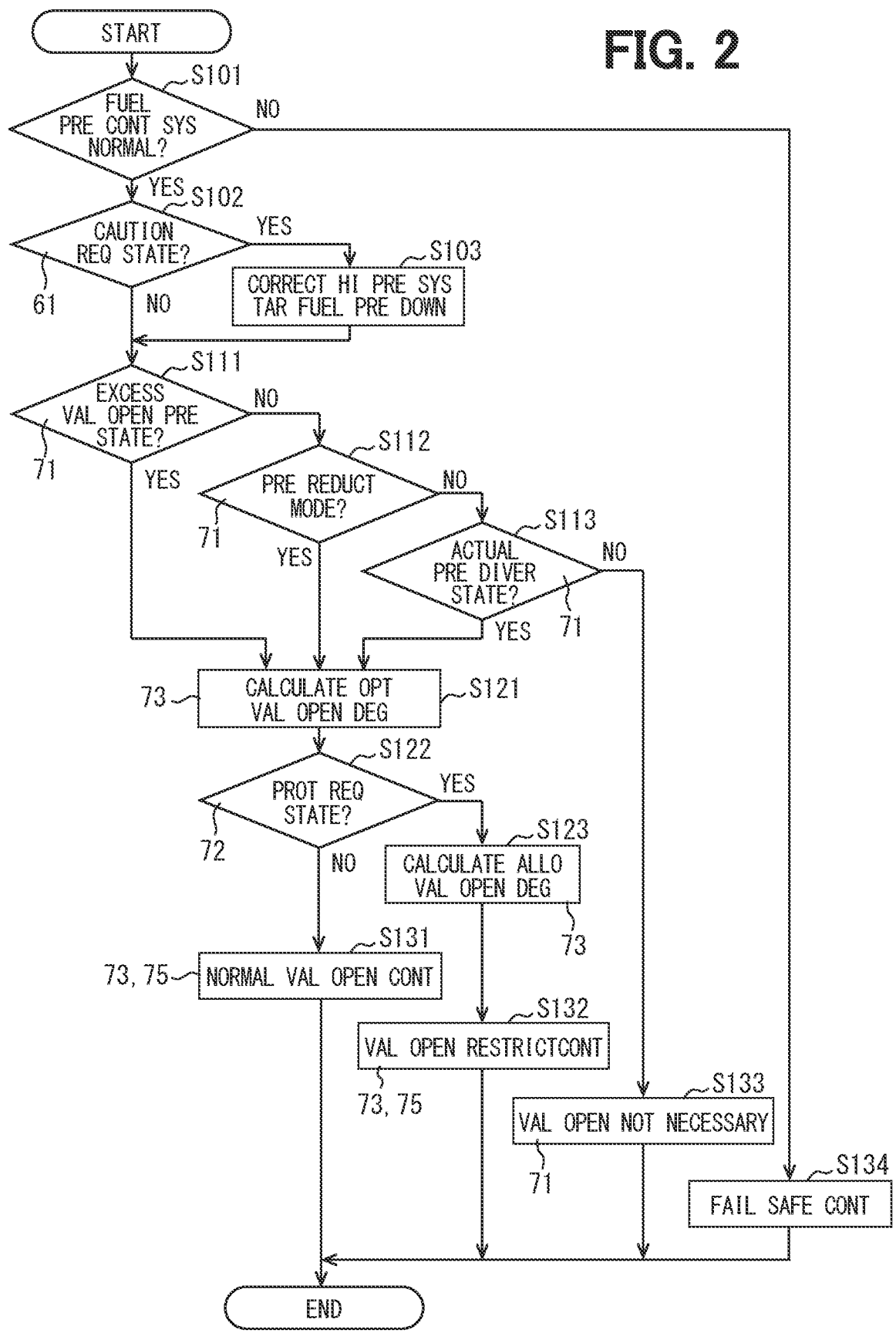
FIG. 2 is a flowchart showing a valve opening control and the like by a control device.

FIG. 2 is a flowchart showing a valve opening control V and the like by a control device 50. This flow is repeated, for example, at predetermined time intervals. In this flow, first, it is determined whether or not the fuel pressure control system 91 is normal (at S101). Specifically, if the pressure reducing valve 38 is stuck open or stuck closed, if the fuel pressure sensor 42 of the second low-pressure system 20 or the fuel pressure sensor 43 of the high-pressure system 30 is detected to have a failure, or if the feed pump 19 is detected to have a failure, the control device 50 determines that there is a failure in the fuel pressure control system 91 ("NO" at S101).

If it is determined in S101 that there is a failure ("NO" at S101), the predetermined fail-safe control is executed as it is (at S134), and the flow ends. On the other hand, when it is determined to be normal in S101, the state determination unit 61 determines whether or not it is in a caution-required state (at S102). When it is determined that it is not in the caution required state ("NO" at S102), the process proceeds to S111. On the other hand, when it is determined in S102 that it is in the caution required state ("YES" at S102), the high-pressure system target fuel pressure PHt is corrected downward (at S103), and then the process proceeds to S111.

When the process proceeds to S111, the valve opening necessity determination unit 71 determines whether or not the valve needs to be opened in S111 to S113. Specifically, first, it is determined whether or not it is in the excessive valve opening pressure state (at S111). If it is determined that it is in the excessive valve opening pressure state ("YES" at S111), the process proceeds to S121. On the other hand, if it is determined in S111 that it is not in the excessive valve opening pressure state, it is determined whether or not it is in the pressure reduction mode (at S112). If it is determined in S112 that it is in the pressure reduction mode ("YES" at S112), the process proceeds to S121. On the other hand, if it is determined in S112 that it is not in the pressure reduction mode ("NO" at S112), it is determined whether or not it is in the actual pressure divergence state (at S113). If it is determined that it is in the actual pressure divergence state ("YES" at S113), the process proceeds to S121. On the other hand, if it is determined in S113 that it is not in the actual pressure divergence state ("NO" at S113), the valve opening necessity determination unit 71 determines that the valve opening is not necessary (at S133), and the flow ends.

On the other hand, when proceeding to S121, the valve opening degree calculation unit 73 first calculates the optimum valve opening degree Ot1 (at S121). Next, the protection necessity determination unit 72 determines whether or not it is in the protection required state (at S122). If it is determined that it is not in the protection required state ("NO" at S122), the normal valve opening control Vn with the optimum valve opening degree Ot1 as the target valve opening degree Ot is executed (at S131), and the flow ends. On the other hand, if it is determined in S122 that it is in the protection required state ("YES" at S122), the valve opening degree calculation unit 73 further calculates the allowable valve opening degree Ot2 (at S123). Then, the valve opening restriction control Vr is executed (at S132), which adopts the smaller one of the optimum valve opening degree Ot1 and the allowable valve opening degree Ot2 as the target valve opening degree Ot, and the flow ends.

Figure 3B:
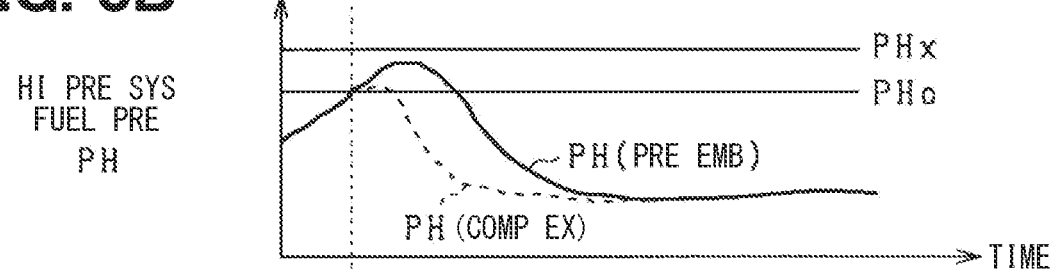
Figure 3C:
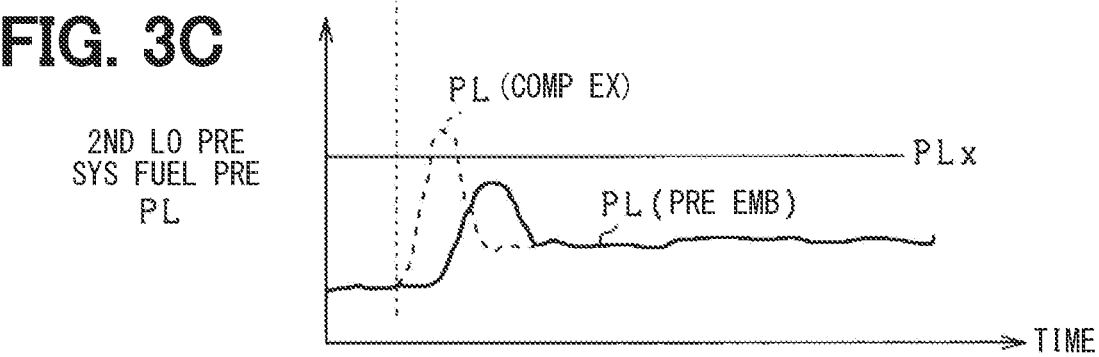

FIGS. 3A to 3C are graphs showing transition of each value when the valve opening restriction control Vr is executed due to the excessive valve opening pressure state. Specifically, here, due to the occurrence of a full discharge anomaly in the booster pump 29, the high-pressure system fuel pressure PH exceeds the valve opening pressure PHo as shown in FIG. 3B to be the excessive valve opening pressure state, so that it is determined that it is in the protection required state, and the valve opening restriction control Vr is executed.

Here, when the optimum valve opening degree Ot1 and the allowable valve opening degree Ot2 are the same value, the optimum valve opening degree Ot1 is adopted as the target valve opening degree Ot. The dashed lines shown in FIGS. 3A to 3C indicate the case where the normal valve opening control Vn is performed without performing the valve opening restriction control Vr in the valve opening control V, that is, a comparative example where the optimum valve opening degree Ot1 is always adopted as the target valve opening degree Ot.

The optimum valve opening degree Ot1 is the optimum valve opening degree when protection of the second low-pressure system 20 is not taken into consideration, as described above. Therefore, the optimum valve opening degree Ot1 rises to a predetermined value (for example, 100%) at once immediately after the valve is opened. This is because the high-pressure system fuel pressure PH may be preferably quickly lowered when the valve opening pressure is exceeded. Then, after the immediate increase, the optimum valve opening degree Ot1 in the immediately increased state is maintained in order to continue suppressing the increase in fuel pressure due to the full discharge anomaly of the booster pump 29. However, when the high-pressure system fuel pressure PH can be reduced to the high-pressure system target fuel pressure PHt by the valve opening control V, the optimum valve opening degree Ot1 is appropriately decreased.

On the other hand, the allowable valve opening degree Ot2 is, as described above, the valve opening degree of the pressure reducing valve 38 that is equal to or lower than the upper limit within the range in which there is no risk that the pressure exceeding the second low-pressure system threshold pressure PLx is applied to the second low-pressure system 20. Therefore, the allowable valve opening degree Ot2 starts increasing from a small value (for example, 20%) immediately after the valve is opened, and gradually increases monotonously to a predetermined value (for example, 100%). This is because if the valve opening degree is increased all at once, the second low-pressure system fuel pressure PL may momentarily increase due to a water hammer caused by fuel starting to flow from the high-pressure system 30 to the second low-pressure system 20 at once.

From the above, as shown in FIG. 3A, immediately after the valve is opened, the allowable valve opening degree Ot2 is lower than the optimum valve opening degree Ot1. During that time, the allowable opening degree Ot2 is adopted as the target opening degree Ot. Thereafter, when the allowable valve opening degree Ot2 reaches the optimum valve opening degree Ot1, the optimum valve opening degree Ot1 is adopted as the target valve opening degree Ot.

As a result, as shown by the solid line in FIG. 3B, the high-pressure system fuel pressure PH gradually changes from increasing to decreasing compared to the comparative example shown by the broken line in FIG. 3B, and the decreasing of the pressure PH becomes slower. However, on the other hand, as shown by the solid line in FIG. 3C, the advantage is obtained such that the temporary increase (i.e., the water hammer) of the second low pressure system fuel pressure PL immediately after the valve is opened is suppressed compared with the comparative example shown by the broken line in FIG. 3C. This prevents the second low-pressure system fuel pressure PL from exceeding the second low-pressure system threshold pressure PLx.

Then, as described above, when it is determined that it is in the caution required state before the valve opening control V is performed, the high-pressure system target fuel pressure PHt is adjusted downward in advance. Therefore, as shown in FIG. 3B, the high pressure system fuel pressure PH is also adjusted so as not to exceed the high pressure system threshold pressure PHx.

Figure 4B:
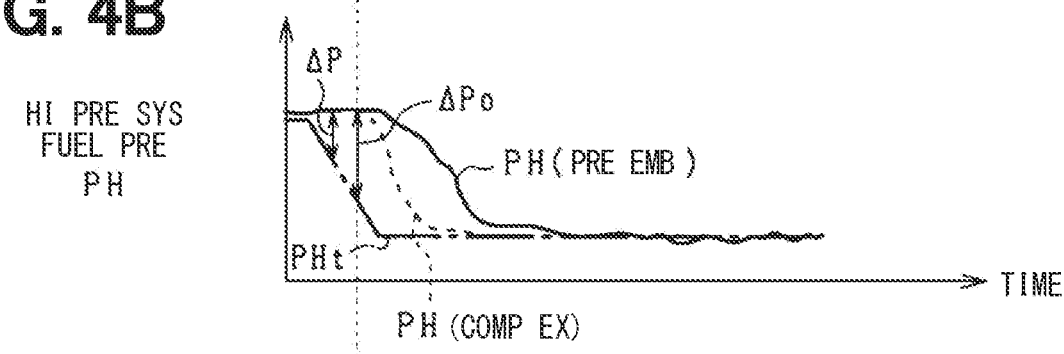
Figure 4C:
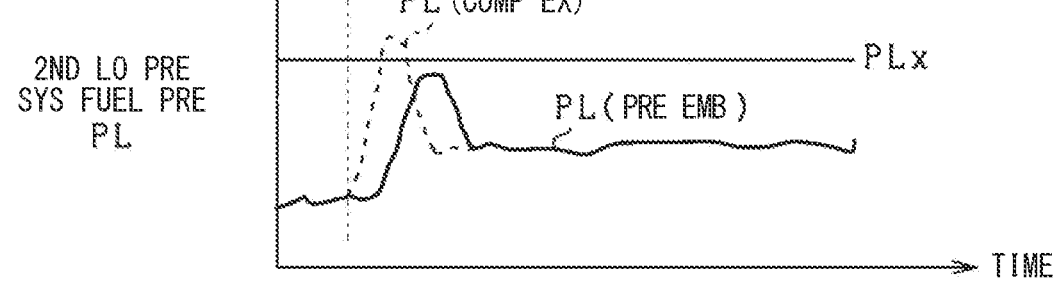

FIGS. 4A to 4C are graphs showing transition of each value when the valve opening restriction control Vr is executed due to the actual pressure divergence state. Specifically, here, as shown in FIG. 4B, when the high-pressure system target fuel pressure PHt sharply decreases, it is determined that the valve needs to be opened and it is in the protection required state so that the valve opening restriction control Vr is executed since the divergence pressure ΔP, which is the difference between the high-pressure system fuel pressure PH and the high-pressure system target fuel pressure PHt, exceeds the divergence threshold pressure ΔPo.

The dashed lines shown in FIGS. 4A to 4C indicate the case where the normal valve opening control Vn is performed without performing the valve opening restriction control Vr in the valve opening control V, that is, a comparative example where the optimum valve opening degree Ot1 is always adopted as the target valve opening degree Ot.

Here, the optimum valve opening degree Ot1 rises to a predetermined value (for example, 60%) at once immediately after the valve is opened. This is because the high-pressure system fuel pressure PH may be preferably quickly reduced to the high-pressure system target fuel pressure PHt when it is in the actual pressure divergence state. After the high-pressure system fuel pressure PH has decreased to the high-pressure system target fuel pressure PHt, the optimum valve opening degree Ot1 becomes zero.

On the other hand, the allowable valve opening degree Ot2 starts increasing from a small value (for example, 20%) immediately after the valve is opened, and gradually increases monotonously to a predetermined value (for example, 100%). This is because if the valve opening degree is increased all at once, the second low-pressure system fuel pressure PL may momentarily increase due to a water hammer caused by fuel starting to flow from the high-pressure system 30 to the second low-pressure system 20 at once.

Therefore, as in the case of FIG. 4A, the allowable valve opening degree Ot2 is lower than the optimum valve opening degree Ot1 immediately after the valve is opened. During that time, the allowable opening degree Ot2 is adopted as the target opening degree Ot. Thereafter, when the allowable valve opening degree Ot2 becomes higher than the optimum valve opening degree Ot1, the optimum valve opening degree Ot1 is adopted as the target valve opening degree Ot. In this embodiment, the allowable valve opening degree Ot2 is used as the target valve opening degree Ot immediately after the valve is opened, so that the timing at which the optimum valve opening degree Ot1 decreases and becomes zero is later than in the comparative example in which the optimum valve opening degree Ot1 is used as the target valve opening degree Ot immediately after the valve is opened.

As a result, as shown by the solid line in FIG. 4B, the high-pressure system fuel pressure PH gradually decreases compared to the comparative example shown by the broken line in FIG. 4B, and the decreasing of the pressure PH becomes slower. However, on the other hand, as shown by the solid line in FIG. 4C, the advantage is obtained such that the temporary increase (i.e., the water hammer) of the second low pressure system fuel pressure PL immediately after the valve is opened is suppressed compared with the comparative example shown by the broken line in FIG. 4C. This prevents the second low-pressure system fuel pressure PL from exceeding the second low-pressure system threshold pressure PLx.

Although a graph showing the transition of each value when the valve opening restriction control Vr is executed in the pressure reducing mode and a description thereof will be omitted, compared to the case of FIG. 4, it is substantially the same as the case of FIG. 4 except that the valve is started to open spontaneously, not depending on the divergence pressure ΔP.

According to this embodiment, the following first to third and fifth to ninth effects are obtained.

In this embodiment, by executing the valve opening restriction control Vr to restrict the degree of opening of the pressure reducing valve 38, for example, as shown in FIG. 3C, the pressure exceeding the second low-pressure system threshold pressure PLx is not applied to the second low-pressure system 20. Therefore, the withstand pressure requirement of the second low-voltage system 20 can be suppressed to the second low-voltage system threshold pressure PLx (as the first effect).

When the protection necessity determination unit 72 determines that it is not in the protection required state, the control device 50 shown in FIG. 1 executes the normal valve opening control Vn in the valve opening control V in which the valve opening restriction control Vr is not performed. On the other hand, when the protection necessity determination unit 72 determines that it is in the protection required state, the control device 50 executes the valve opening restriction control Vr in the valve opening control V to restrict the degree of opening of the pressure reducing valve 38. Therefore, the valve opening restriction control Vr can be executed to restrict the degree of valve opening only when it is in the protection required state, and unnecessary valve opening restriction can be avoided (as a second effect).

In addition, the protection-required state includes a state such that, if the valve opening restriction control Vr is not executed in the valve opening control V, there is a risk that the pressure exceeding the second low pressure system threshold pressure PLx is applied to the second low pressure system 20 due to the water hammer caused by the fuel released by the valve opening control V. Therefore, it is possible to prevent the pressure exceeding the second low-pressure system threshold pressure PLx from being applied to the second low-pressure system 20 due to the water hammer (as the third effect).

Further, in the valve opening restriction control Vr, for example, as indicated in FIG. 3A, the target valve opening degree Ot is set to be a smaller value (for example, 20%) than the predetermined value (for example, 100%) in the beginning of the opening of the pressure reducing valve, and then, the target valve opening degree Ot is gradually increased to the predetermined value (for example, 100%). As a result, compared to the comparative example in which the target valve opening degree Ot is set to the predetermined value (for example, 100%) in the beginning of the valve opening, the pressure to be applied to the second low-pressure system 20 can be reduce (as the fifth effect).

Further, as shown in FIG. 4A, for example, in the valve opening limit control Vr, both the valve opening degrees Ot1 and Ot2, i.e., both the optimum valve opening degree Ot1 and the allowable valve opening degree Ot2 are calculated, and the smaller one of the valve opening degrees Ot1 and Ot2 is adopted as the target valve opening degree Ot. Therefore, even when executing the valve opening restriction control Vr, the optimum valve opening degree Ot1 can be used as much as possible (as the sixth effect).

Further, for example, in the valve opening limit control Vr, the control device 50 executes the balance valve opening for opening the pressure reducing valve 38 so that the high-pressure system fuel pressure PH is prevented from exceeding a predetermined high-pressure system threshold pressure PHx as shown in FIG. 3B, and the pressure exceeding the second low-pressure system threshold pressure PLx is not applied to the second low-pressure system 20, as shown in FIG. 3C. Therefore, it is possible to achieve both protection of the high pressure system 30 and protection of the second low pressure system 20 (as the seventh effect).

The state determination unit 61 shown in FIG. 1 determines whether or not it is in a caution required state in which there is a risk that the balance valve opening is not executable in the valve opening restriction control Vr if a predetermined anomaly increase in the high-pressure system fuel pressure PH occurs. Then, on the condition that the state determination unit 61 determines that it is in the caution required state, the target fuel pressure calculation unit 62 downwardly corrects the high-pressure system target fuel pressure PHt. As a result, even if the predetermined anomaly increase occurs at the high-pressure system fuel pressure PH, the balance valve opening can be executed. Therefore, the balance valve opening can be reliably performed (as the eighth effect).

Further, the above-mentioned predetermined anomaly increase includes fuel pressure increase due to a full discharge anomaly in which the discharge flow rate of the booster pump 29 becomes the maximum value of the discharge flow rate that can be discharged by the booster pump 29. Therefore, even when a full discharge anomaly occurs, the balance valve opening can be executed (as the ninth effect).

Other Embodiments

For example, the above embodiment can be modified as follows. For example, as shown in FIG. 1 and the like, in each embodiment, the base end of the return pipe 39 (that is, the end on the return source side) is connected to the pressure accumulation chamber 33. Alternatively, the base end of the return pipe 39 may be connected to the third pipe 32. A pressure reducing valve 38 may be provided at the connection portion of the return pipe 39 with the third pipe 32 or at the return pipe 39.

Further, for example, in each embodiment, the tip of the return pipe 39 (that is, the end on the return destination side) is connected to the second pipe 22 in the second low-pressure system 20. Alternatively, the tip may be connected to other parts in the second low-pressure system 20 or the first low-pressure system 10. Specifically, for example, the tip of the return pipe 39 may be connected to the booster pump 29, the feed pump 19, the first pipe 12, or the fuel tank 11. Further, for example, in the case where a check valve is provided in the connecting portion of the pressure accumulation chamber 33 to the third pipe 32 or in the third pipe 32 or the like, the tip of the return pipe 39 may be connected to the boost pump 29 side of the third pipe 32 than the check valve.

Further, for example, in the first embodiment, the protection-required state is the state in which there is a risk that the pressure exceeding the low-pressure system threshold pressure PLx is applied to the second low-pressure system 20 as shown by the dashed line in FIG. 3C unless the valve-opening restriction control Vr is executed in the valve-opening control V. Alternatively, the protection-required state may be a state in which there is a risk that the pressure exceeding a predetermined return pipe threshold pressure is applied to the return pipe 39 unless the valve opening restriction control Vr is executed in the valve opening control V. The valve opening restriction control Vr may be a control to open the pressure reducing valve 38 while limiting the degree of opening of the pressure reducing valve 38 so that the pressure exceeding the return pipe threshold pressure is not applied to the return pipe 39.

Further, for example, in the first embodiment, the protection-required state is a state in which there is a risk that the pressure exceeding the second low-pressure system threshold pressure PLx is applied to the second low-pressure system 20 due to water hammer caused by the fuel released by the valve-opening control V as indicated by the broken line in FIG. 3C unless the valve-opening restriction control Vr is executed in the valve-opening control V. Alternatively, the protection-required state may be a state in which there is a risk that the pressure exceeding the predetermined threshold pressure is applied to a passage for releasing the pressure or the releasing destination due to the pressure increase caused by the evaporation of the fuel released by the valve-opening control V unless the valve-opening restriction control Vr is executed in the valve-opening control. In this case, it is possible to prevent the pressure exceeding a predetermined threshold pressure from being applied to the release destination or the release passage due to the evaporation (as the fourth effect).

Although the present disclosure has been described in accordance with the examples, it is understood that the present disclosure is not limited to such examples or structures. The present disclosure incorporates various modifications and variations within the scope of equivalents. In addition, while the various combinations and configurations, which are preferred, other combinations and configurations, including more, less or only a single element, are also within the spirit and scope of the present disclosure.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S101. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A fuel pressure control system for a fuel supply system that supplies fuel to an injector of an engine, the fuel pressure control system comprising:
    a booster pump for increasing a high-pressure system fuel pressure as a fuel pressure of a high-pressure system as a part of the fuel supply system by discharging the fuel to the high-pressure system;
    a pressure reducing valve for reducing the high-pressure system fuel pressure; and
    a control device for controlling the booster pump and the pressure reducing valve, wherein:
    the control device includes a valve opening necessity determination unit for determining whether the pressure reducing valve needs to be opened;
    the control device executes a valve opening control for opening the pressure reducing valve to release the high-pressure system fuel pressure to an outside of the high-pressure system under a condition that the valve opening necessity determination unit determines that the pressure reducing valve needs to be opened;
    the control device further includes a restriction execution unit for performing a valve opening restriction control in the valve opening control for opening the pressure reducing valve with restricting a valve opening degree of the pressure reducing valve to prevent a pressure exceeding a predetermined target portion threshold pressure from being applied to a target portion as a release destination or a release passage of the high-pressure system fuel pressure in the valve opening control;
    the control device further includes a protection necessity determination unit that determines whether it is in a protection-required state as a predetermined state in which there is a risk that the pressure exceeding the target portion threshold pressure is applied to the target portion unless the valve opening restriction control is executed in the valve opening control;
    the control device executes a normal valve opening control in the valve opening control without performing the valve opening restriction control when the valve opening necessity determination unit determines that the pressure reducing valve needs to be opened and the protection necessity determination unit determines that it is not in the protection-required state; and the control device executes the valve opening restriction control using the restriction execution unit to restrict the valve opening degree of the pressure reducing valve compared to a case where the valve opening restriction control is not executed when the valve opening necessity determination unit determines that the pressure reducing valve needs to be opened and the protection necessity determination unit determines that it is in the protection-required state.

2. The fuel pressure control system according to claim 1, wherein:

the protection-required state includes a state in which there is a risk that the pressure exceeding the target portion threshold pressure is applied to the target portion due to water hammer caused by the fuel released by the valve opening control unless the valve opening restriction control is executed in the valve opening control.

3. The fuel pressure control system according to claim 1, wherein:

the protection-required state includes a state in which there is a risk that the pressure exceeding the target portion threshold pressure is applied to the target portion due to pressure increase caused by evaporation of the fuel released by the valve opening control unless the valve opening restriction control is executed in the valve opening control.

4. The fuel pressure control system according to claim 1, wherein:

the control device further includes a valve opening degree calculation unit that calculates a target valve opening degree when the valve opening necessity determination unit determines that the pressure reducing valve needs to be opened;

the control device controls the valve opening degree of the pressure reducing valve so as to approach a calculated target valve opening degree;

in the valve opening restriction control, the valve opening degree calculation unit calculates a predetermined optimum valve opening degree and an allowable valve opening degree as the opening degree of the pressure reducing valve equal to or lower than an upper limit within a range in which there is no risk that the pressure exceeding the target portion threshold pressure is applied to the target portion as the target valve opening degree; and in the valve opening restriction control, smaller one of the optimum valve opening degree and the allowable valve opening degree is set as the target valve opening degree.

5. A fuel pressure control system for a fuel supply system that supplies fuel to an injector of an engine, the fuel pressure control system comprising:

a booster pump for increasing a high-pressure system fuel pressure as a fuel pressure of a high-pressure system as a part of the fuel supply system by discharging the fuel to the high-pressure system;

a pressure reducing valve for reducing the high-pressure system fuel pressure; and a control device for controlling the booster pump and the pressure reducing valve, wherein:

the control device includes a valve opening necessity determination unit for determining whether the pressure reducing valve needs to be opened;

the control device executes a valve opening control for opening the pressure reducing valve to release the high-pressure system fuel pressure to an outside of the high-pressure system under a condition that the valve opening necessity determination unit determines that the pressure reducing valve needs to be opened;

the control device further includes a restriction execution unit for performing a valve opening restriction control in the valve opening control for opening the pressure reducing valve with restricting a valve opening degree of the pressure reducing valve to prevent a pressure exceeding a predetermined target portion threshold pressure from being applied to a target portion as a release destination or a release passage of the high-pressure system fuel pressure in the valve opening control;

the control device further includes a valve opening degree calculation unit that calculates a target valve opening degree when the valve opening necessity determination unit determines that the pressure reducing valve needs to be opened;

the control device controls the valve opening degree of the pressure reducing valve so as to approach a calculated target valve opening degree;

in the valve opening restriction control, the valve opening degree calculation unit calculates a predetermined optimum valve opening degree and an allowable valve opening degree as the opening degree of the pressure reducing valve equal to or lower than an upper limit within a range in which there is no risk that the pressure exceeding the target portion threshold pressure is applied to the target portion as the target valve opening degree; and in the valve opening restriction control, smaller one of the optimum valve opening degree and the allowable valve opening degree is set as the target valve opening degree.

6. The fuel pressure control system according to claim 5, wherein:

in the valve opening restriction control, a balance valve opening control for opening the pressure reducing valve to prevent the high-pressure system fuel pressure from exceeding a predetermined high-pressure system threshold pressure and to prevent the pressure exceeding the target portion threshold pressure from being applied to the target portion.

7. The fuel pressure control system according to claim 6, wherein:

the control device further includes a target fuel pressure calculation unit that calculates a predetermined high-pressure system target fuel pressure;

the control device controls the high-pressure system fuel pressure so as to approach a calculated high-pressure system target fuel pressure;

the control device further incudes a state determination unit that determines whether it is in a caution required state in which there is a risk that the balance valve opening control is not executable in the valve opening restriction control if a predetermined anomaly increase of the high-pressure system fuel pressure; and the control device starts executing a predetermined fuel pressure restriction control when the state determination unit determines that it is in the caution required state to set the high-pressure system target fuel pressure to be lower than a case where the fuel pressure restriction control is not performed, so that the balance valve opening control is executable even if the predetermined anomaly increase occurs.

8. A fuel pressure control system for a fuel supply system that supplies fuel to an injector of an engine, the fuel pressure control system comprising:
   a booster pump for increasing a high-pressure system fuel pressure as a fuel pressure of a high-pressure system as a part of the fuel supply system by discharging the fuel to the high-pressure system;
   a pressure reducing valve for reducing the high-pressure system fuel pressure; and
   a control device for controlling the booster pump and the pressure reducing valve, wherein:
   the control device includes a valve opening necessity determination unit for determining whether the pressure reducing valve needs to be opened;
   the control device executes a valve opening control for opening the pressure reducing valve to release the high-pressure system fuel pressure to an outside of the high-pressure system under a condition that the valve opening necessity determination unit determines that the pressure reducing valve needs to be opened;
   the control device further includes a restriction execution unit for performing a valve opening restriction control in the valve opening control for opening the pressure reducing valve with restricting a valve opening degree of the pressure reducing valve to prevent a pressure exceeding a predetermined target portion threshold pressure from being applied to a target portion as a release destination or a release passage of the high-pressure system fuel pressure in the valve opening control;
   in the valve opening restriction control, a balance valve opening control for opening the pressure reducing valve to prevent the high-pressure system fuel pressure from exceeding a predetermined high-pressure system threshold pressure and to prevent the pressure exceeding the target portion threshold pressure from being applied to the target portion;
   the control device further includes a target fuel pressure calculation unit that calculates a predetermined high-pressure system target fuel pressure;
   the control device controls the high-pressure system fuel pressure so as to approach a calculated high-pressure system target fuel pressure;
   the control device further incudes a state determination unit that determines whether it is in a caution required state in which there is a risk that the balance valve opening control is not executable in the valve opening restriction control if a predetermined anomaly increase of the high-pressure system fuel pressure; and
   the control device starts executing a predetermined fuel pressure restriction control when the state determination unit determines that it is in the caution required state to set the high-pressure system target fuel pressure to be lower than a case where the fuel pressure restriction control is not performed, so that the balance valve opening control is executable even if the predetermined anomaly increase occurs.

9. The fuel pressure control system according to claim 8, wherein:
   the predetermined anomaly increase includes a fuel pressure increase due to a full discharge anomaly in which a discharge flow rate of the booster pump reaches a maximum discharge flow rate that can be discharged by the booster pump.

10. The fuel pressure control system according to claim 8, wherein:
   the control device further includes a valve opening degree calculation unit that calculates a target valve opening degree when the valve opening necessity determination unit determines that the pressure reducing valve needs to be opened;
   the control device controls the valve opening degree of the pressure reducing valve so as to approach a calculated target valve opening degree;
   in the valve opening restriction control by the restriction execution unit, the target valve opening degree is set to a value smaller than a predetermined value in a beginning of opening the pressure reducing valve; and
   in the valve-opening restriction control by the restriction execution unit, the target valve opening degree is gradually increased to the predetermined value after the beginning of opening to reduce the pressure applied to the target portion caused by the opening of the pressure reducing valve, compared with a case where the target valve opening degree is set to the predetermined value in the beginning of the opening of the pressure reducing valve.

* * * * *